United States Patent
Kakoo

(10) Patent No.: US 7,353,808 B2
(45) Date of Patent: Apr. 8, 2008

(54) BREATHER SYSTEM FOR FUEL TANK

(75) Inventor: Hiromi Kakoo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 110 days.

(21) Appl. No.: 11/341,866

(22) Filed: Jan. 30, 2006

(65) Prior Publication Data

US 2006/0185742 A1    Aug. 24, 2006

(30) Foreign Application Priority Data

Jan. 31, 2005    (JP)    ............................. 2005-022402

(51) Int. Cl.
*F02M 37/20*    (2006.01)
(52) U.S. Cl. ........................................ 123/516; 141/37
(58) Field of Classification Search ................. 123/516; 137/584
See application file for complete search history.

(56) References Cited

U.S. PATENT DOCUMENTS

| | | | | |
|---|---|---|---|---|
| 3,874,471 A | * | 4/1975 | Kloefkorn | ................... 180/69.4 |
| 4,028,075 A | * | 6/1977 | Roberge | ........................ 96/139 |
| 4,285,440 A | * | 8/1981 | Adams | ........................ 220/202 |
| 4,666,058 A | * | 5/1987 | Harris | ........................ 220/373 |
| 4,690,293 A | * | 9/1987 | Uranishi et al. | ............ 220/86.2 |
| 4,747,508 A | * | 5/1988 | Sherwood | .................... 220/86.2 |
| 4,816,045 A | * | 3/1989 | Szlaga et al. | .................. 96/164 |
| 5,275,213 A | * | 1/1994 | Perkins | ......................... 141/59 |
| 5,503,199 A | * | 4/1996 | Whitley et al. | .............. 141/312 |
| 5,687,778 A | * | 11/1997 | Harris | ........................... 141/59 |
| 7,086,389 B2 | * | 8/2006 | Yamada | ....................... 123/516 |
| 7,143,783 B2 | * | 12/2006 | Emke et al. | .............. 137/512.1 |
| 2004/0084485 A1 | * | 5/2004 | Carlton | ........................ 222/527 |
| 2005/0121004 A1 | * | 6/2005 | Yamada et al. | .............. 123/519 |
| 2007/0108212 A1 | * | 5/2007 | Nelson | ......................... 220/371 |

FOREIGN PATENT DOCUMENTS

JP    62-196791    12/1987

* cited by examiner

*Primary Examiner*—Thomas Moulis
(74) *Attorney, Agent, or Firm*—Arent Fox LLP

(57) ABSTRACT

In a breather system for a fuel tank having a tank body, a fuel supply port opened and closed by a fuel cap provided in a central portion of an upper wall of the tank body, wherein an upper end of a breather pipe is located to face a central portion of a fuel supply port. When the fuel supply port is closed by the fuel cap, a breather chamber is formed in the fuel cap and the breather chamber communicates with the breather pipe. Thus, when the fuel tank is inclined, fuel is prevented from entering the breather pipe, and the fuel supply port is not immersed in the fuel, thereby maintaining the sealability of the fuel supply port.

6 Claims, 5 Drawing Sheets

BREATHER SYSTEM FOR FUEL TANK

RELATED APPLICATION DATA

The present invention is based upon Japanese priority application No. 2005-22402, filed Jan. 31, 2005, which is hereby incorporated in its entirety herein by reference.

BACKGROUND OF THE INVENTION

1. Field of the Invention

The present invention relates to a breather system for a fuel tank, and more particularly to a breather system for a fuel tank for supplying fuel to an engine of an engine-driven working machine.

2. Description of the Related Art

A fuel tank for supplying fuel to an engine of an engine-driven working machine, generally comprises a breather system for performing breathing action between the outside and an air chamber provided in an upper portion of the fuel tank in order to maintain a constant pressure in the fuel tank.

In a conventional breather system, as disclosed in Japanese Utility Model Application Laid-open No. 62-196791, a breather cap 2 is mounted on one side of an upper wall of a fuel tank 1 apart from a fuel supply port of the fuel tank 1; a breather chamber is formed within the breather cap 2 to communicate with an air chamber in an upper portion of the fuel tank 1; and a breather pipe opening into the atmosphere is provided to communicate with the breather chamber, thereby performing breathing action between the inside of the fuel tank and the atmosphere.

In the breather system disclosed in Japanese Utility Model Application Laid-open No. 62-196791, even if the liquid surface of the fuel within the fuel tank fluctuates due to vibration or the like applied to the fuel tank and an inlet of the breather pipe is instantaneously immersed in the fuel, the fuel is temporarily stored in the breather pipe, whereby the fuel is prevented from entering the breather pipe.

In this breather system, however, not only is the breather chamber required to be provided in the fuel tank apart from the fuel supply port, but also the breather pipe is extended to the outside going around the outer periphery of the fuel tank. Therefore, not only is the structure of the fuel tank itself complicated to increase the cost, but also handling of the breather pipe becomes difficult. Another problem is in a situation where the fuel tank with the breather chamber is placed on its lower side for an extended time. The immersion of the breather pipe in the fuel is thus also extended so that the fuel enters the breather pipe.

SUMMARY OF THE INVENTION

Accordingly, it is an object of the present invention to provide a novel breather system for a fuel tank, wherein the above-described problems are solved.

In order to achieve the above object there is provided a breather system for a fuel tank, comprising: a breather pipe mounted on a tank body so that breathing action is performed between an air chamber provided in an upper portion of the tank body and the external air through the breather pipe, wherein a fuel supply port opened and closed by a fuel cap is provided in a central portion of an upper wall of the tank body, and an upper end of the breather pipe is located to face a central portion of the fuel supply port so that, when the fuel supply port is closed by the fuel cap, a breather chamber formed in the fuel cap communicates with the breather pipe.

According to a second feature of the present invention, an open upper surface of the upper end of the breather pipe facing the fuel supply port is fluid-tightly sealed by a cap seal on the upper end of the breather pipe, and a ventilating hole communicating with the breather pipe is opened in a side face of the cap seal.

According to a third feature of the present invention, a strainer for filtering fuel flowing into the breather chamber and returning the filtered fuel to the tank body, is hung from a lower portion of the fuel supply port, and the upper end portion of the breather pipe is passed through the strainer into the breather chamber.

According to a fourth feature of the present invention, a lower end of the breather pipe is extended through a bottom wall of the tank body to the outside and connected to a canister.

With any of the features of the present invention, the fuel supply port opened and closed by the fuel cap is provided at the central portion of the upper wall of the tank body, and the upper end of the breather pipe is located to face the central portion of the fuel supply port. Therefore, when the fuel tank is inclined, the fuel is prevented from entering the breather pipe and the fuel cap itself cannot be immersed in the fuel, thereby maintaining the sealability of the fuel supply port. Further, because the breather chamber is provided in the fuel cap, the structure of the tank body is simplified to contribute to cost reduction of the fuel tank.

With the second feature of the present invention, the open upper surface of the upper end of the breather pipe facing the fuel supply port is fluid-tightly sealed by the cap seal, and the ventilating hole is opened in the side face of the cap seal to communicate with the breather pipe. Therefore, during charge of the fuel from the fuel supply port, the charged fuel cannot flow into the breather pipe.

With the third feature of the present invention, the strainer is hung from the lower portion of the fuel supply port, and the upper end portion of the breather pipe is passed through the strainer into the breather chamber. Therefore, the upper end portion of the breather pipe is guided by the strainer to be appropriately located at the central position of the fuel supply port.

With the fourth feature of the present invention, the lower end of the breather pipe extends through the bottom wall of the tank body and is connected to the canister. Therefore, the breather pipe does not extend around the outer periphery of the fuel tank and is easy to handle.

The above and other objects, features and advantages of the invention will become apparent from the following description of the preferred embodiment taken in conjunction with the accompanying drawings.

DETAILED DESCRIPTION OF PREFERRED EMBODIMENT

The present invention will now be described by way of an embodiment of the present invention with reference to the accompanying drawings.

Figure 1:
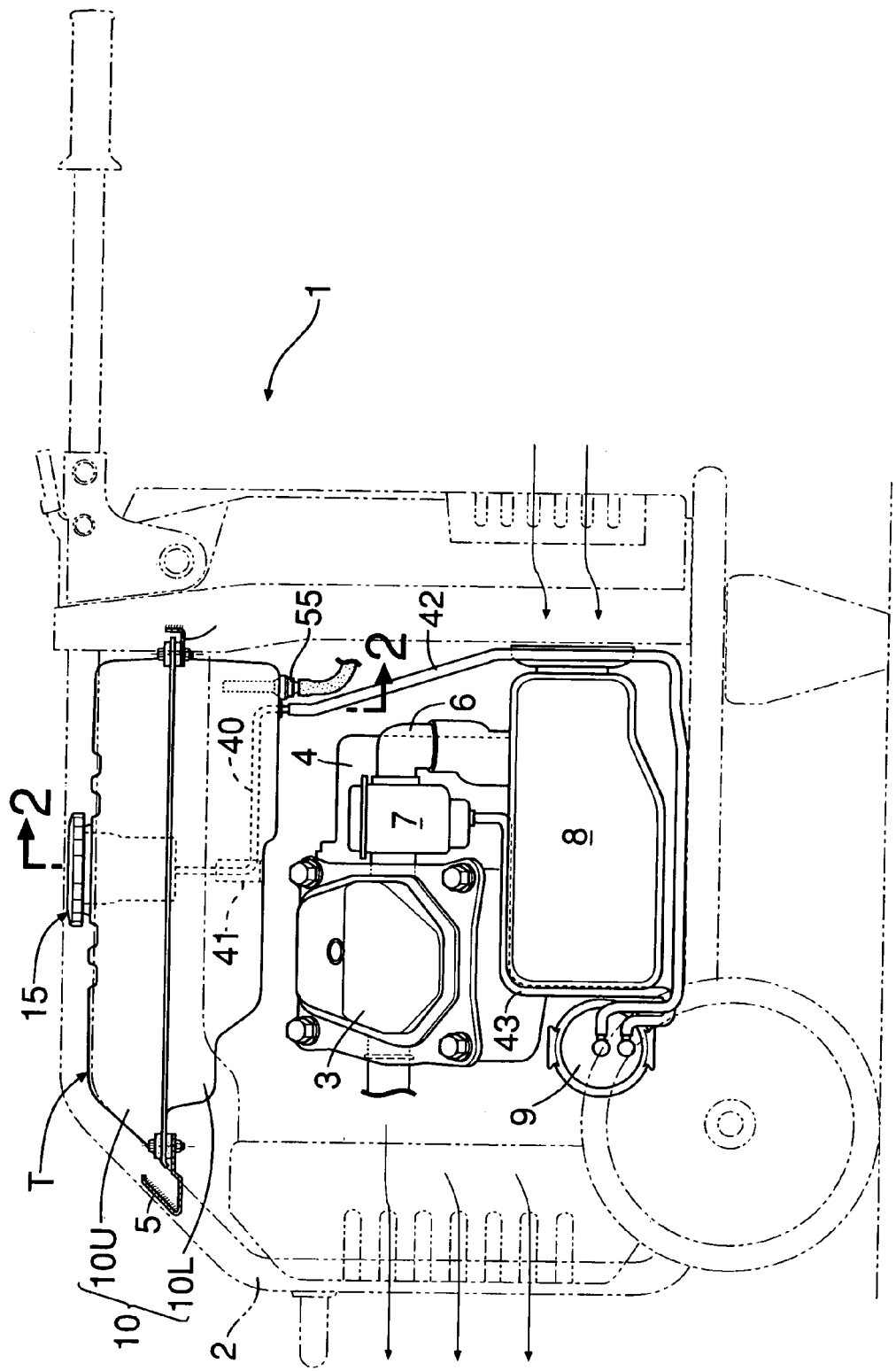
FIG. 1 is a side view of an engine-driven working machine provided with a fuel tank according to the present invention.

Referring to FIG. 1, a transportable engine-driven working machine 1 comprises a frame 2 formed by pipe members, and an engine 3 and a generator 4 driven by the engine 3 which are resiliently supported at a lower portion of the frame 2. A fuel tank T according to the present invention is supported at an upper portion of the frame 2 by a support bracket 5 fixed to the upper portion. A carburetor 7 is connected to a cylinder section of the engine 3. An air cleaner 8 is disposed at the lower portion of the frame 2, and is connected to the carburetor 7 through an intake pipe 6. A canister 9 is disposed on one side of the air cleaner 8 in order to absorb fuel gas evaporated in the fuel tank T.

The structure of the fuel tank T will be described below with reference to FIGS. 2 to 5.

The fuel tank T has a tank body 10 formed into a vertically flat closed quadrilateral box-shape comprising an upper tank half 10U and a lower tank half 10L which are coupled to each other along their peripheral edges by crimping. The upper tank half 10U and the lower tank half 10L are molded by drawing a metal plate, a hard synthetic resin plate or the like.

A fuel supply port 11 for charging fuel into the fuel tank T is opened in a central portion of an upper surface of the tank body 10. The fuel supply port 11 is formed by an upwardly bulging wall 12 from an upper surface of the upper tank half 10U. A funnel-shaped support wall 13 bulging downwards is welded to an inner surface of the upper tank half 10U so as to face the bulging wall 12. A plurality of air communication passages 28 are radially formed between an outer peripheral portion of the support wall 13 and an upper wall of the upper tank half 10U. An air chamber 14 in an upper portion of the fuel tank T and a breather chamber 27 which will be described later, communicate with each other through the air communication passages 28.

A fuel cap 15 capable of opening and closing the fuel supply port 11 is derrickingly turnably mounted in a central portion of the upper surface of the upper tank half 10U.

The structure of the fuel cap 15 will be described below. The fuel cap 15 includes a cap body 16 comprising an outer cap member 17 and an inner cap member 18. The outer cap member 17 is formed into a crown-shape having a diameter larger than that of the fuel supply port 11 to cover the fuel supply port 11, and has a grip portion 17g on its outer peripheral surface. The inner cap member 18 is formed into a bottomed cylindrical shape having a diameter smaller than that of the fuel supply port 11. An outer edge of a flange 18f protruding outward from an upper edge of the inner cap member 18 is secured by crimping to an inner surface of an outer periphery of the outer cap member 17. An opening/closing arm 20 is fixed at its leading end to one side of the cap body 16, and derrickingly turnably connected at its base end to a bracket 21 fixed to the upper surface of the upper tank half 19U by a hinge pin 22. An annular packing 23 is integrally fitted to a lower surface of the flange 18f of the cap body 16. The cap body 16 is capable of being opened and closed about the hinge pin 22 through the opening/closing arm 20. When the cap body 16 is at a closed position as shown in FIGS. 2 and 3, it liquid-tightly seals the fuel supply port 11 as shown in FIGS. 2 and 3.

A separator 25 is fixed to an upper portion within the cap body 16 concentric with the cap body 16. The separator 25 is formed into a hollow short cylindrical shape and defines the breather chamber 27 within the cap body 16 in cooperation with the inner cap member 18. A passing bore 26 is formed in a central portion of the bottom of the separator 25 to permit an upper portion of a cap seal 50 to be passed therethrough. As shown in FIGS. 3 and 4, a pair of through-holes 29, 29 radially facing each other are made in a peripheral surface of the inner cap member 18. Opposite ends of a spring seat 31 are passed through and engaged in the through-holes 29, 29. A compression coil spring 32 is mounted under compression between the spring seat 31 and a bottom surface of the inner cap member 18. The compression coil spring 32 urges the packing 23 to seat in the fuel supply port 11, when the fuel cap 15 is in a closed position.

Figure 3:
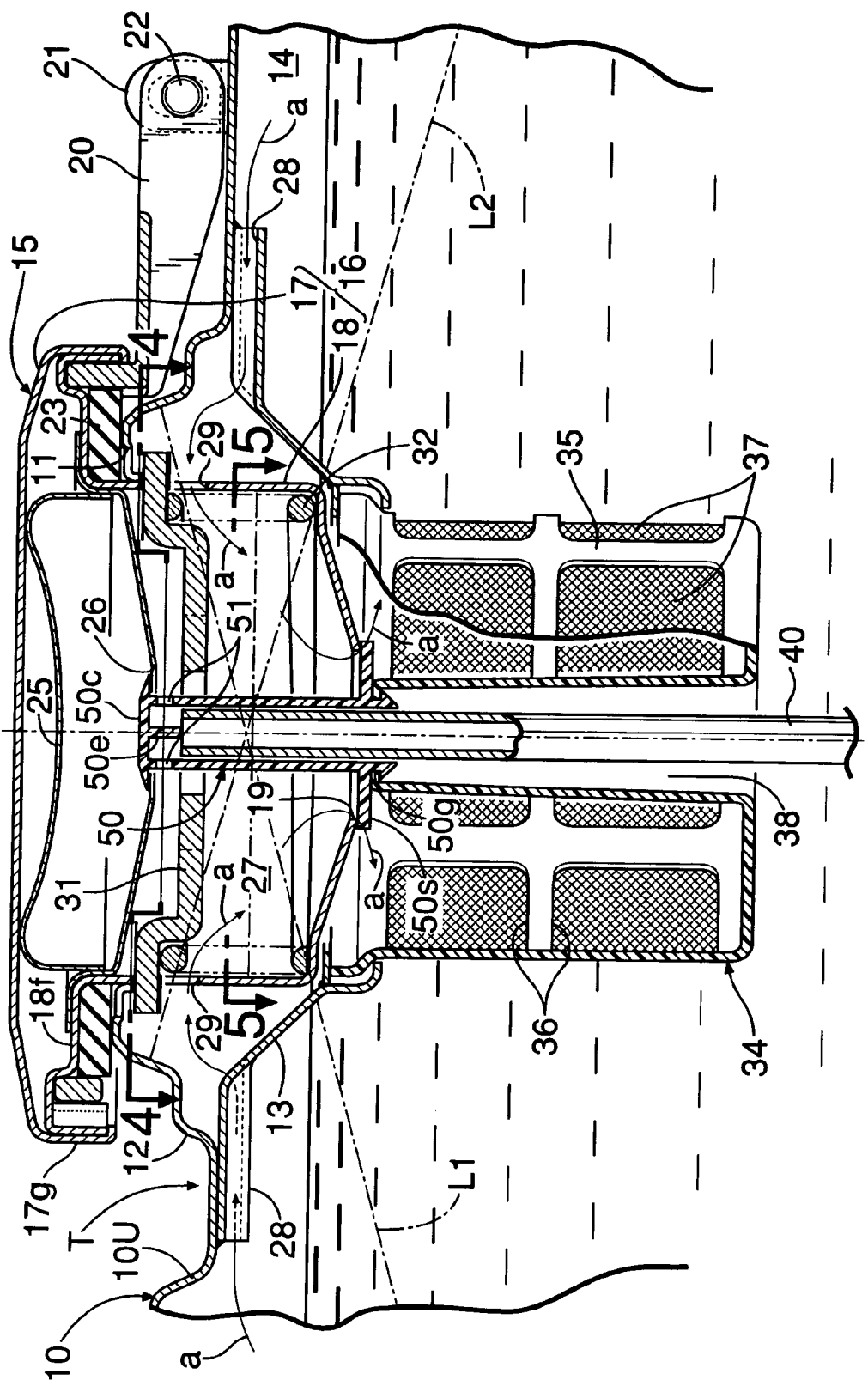
FIG. 3 is an enlarged view of Part 3 surrounded by a chain line in FIG. 2.
Figure 4:
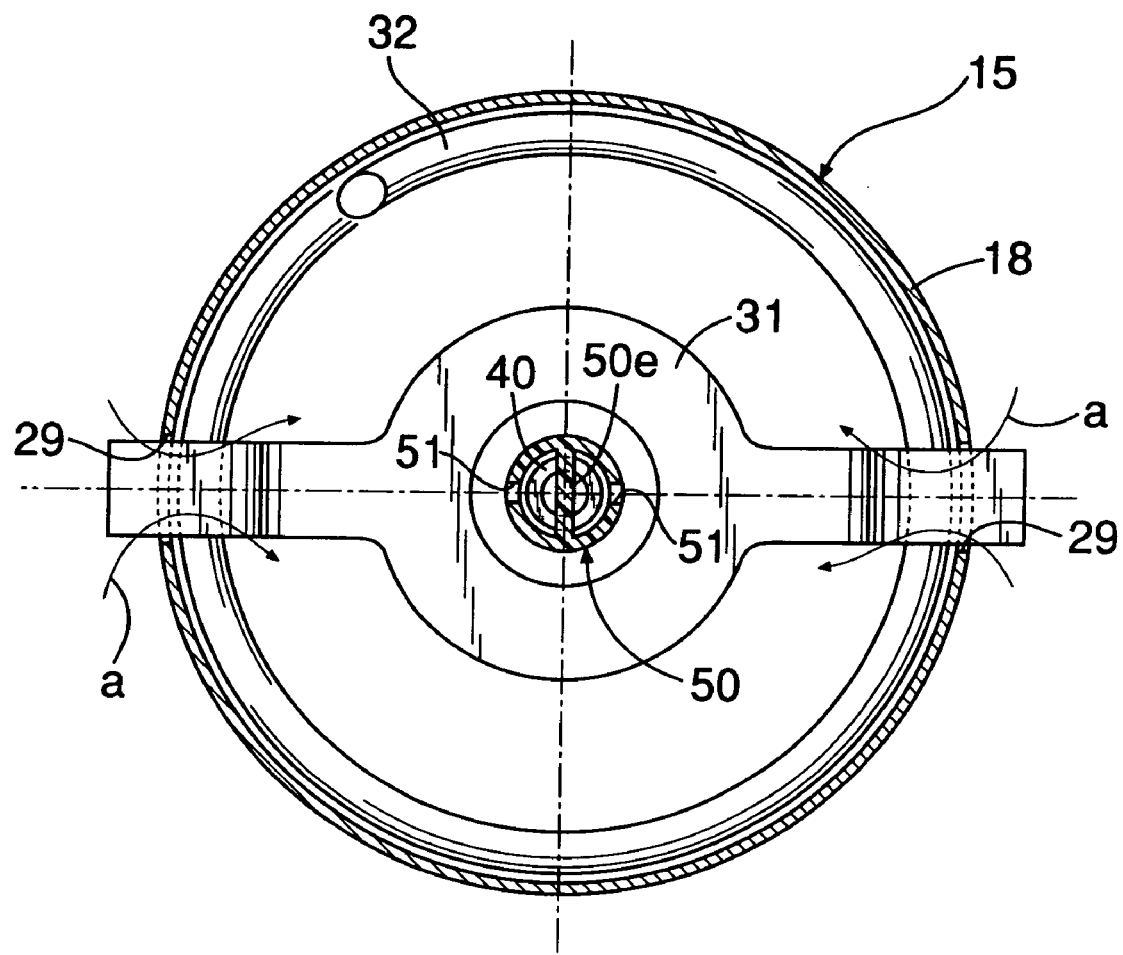
FIG. 4 is a sectional view taken along a line 4-4 in FIG. 3.
Figure 5:
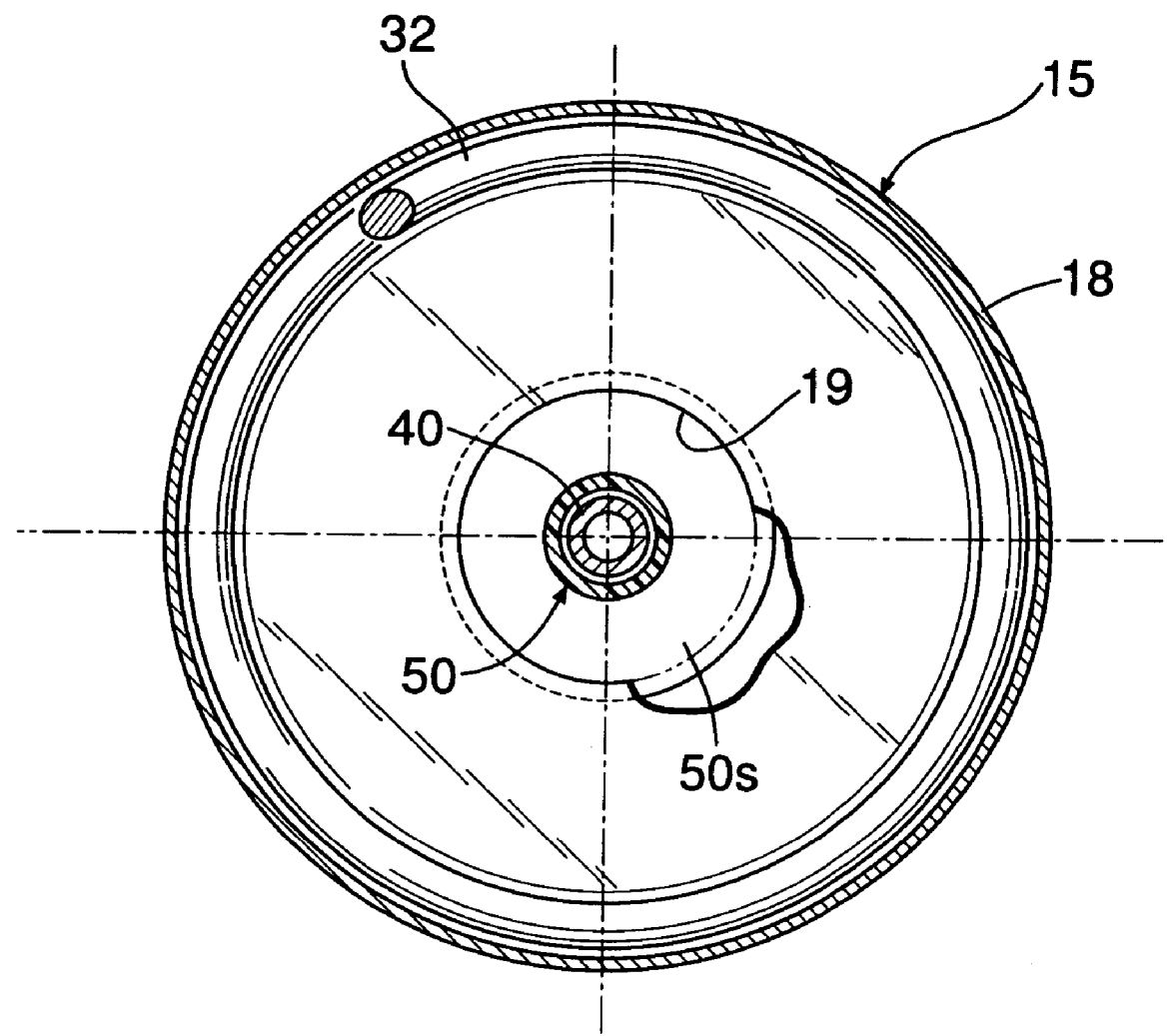
FIG. 5 is a sectional view taken along a line 5-5 in FIG. 3.

As most clearly shown in FIG. 3, a strainer 34 disposed concentrically with the fuel cap 15 is detachably hung from a lower portion of the support wall 13. The strainer 34 is formed into a bottomed-cylindrical cage-shape, and comprises a frame 35 having a plurality of window holes 36 and a filter element 37 which is a metal mesh extended in the frame 35. The filter element 37 is capable of capturing and filtering foreign matter contained in the fuel which is charged into the fuel tank T through the fuel supply port 11. A through-passage 38 is integrally provided in the strainer 34 to extend upwards straight in the strainer 34 from a central portion of a bottom surface of the frame 35 along a center axis of the strainer 34. The through-passage 38 is formed into a hollow cylindrical shape with its upper end communicating with the fuel supply port 11 and its lower end communicating with the inside of the tank body 16. The through-passage 38 has an inner diameter large enough for an upper end of a breather pipe, which will be described later, to be easily inserted into the through-passage 38 with a clearance left therebetween, and is formed into a shape tapering from its lower end toward its upper end.

Figure 2:
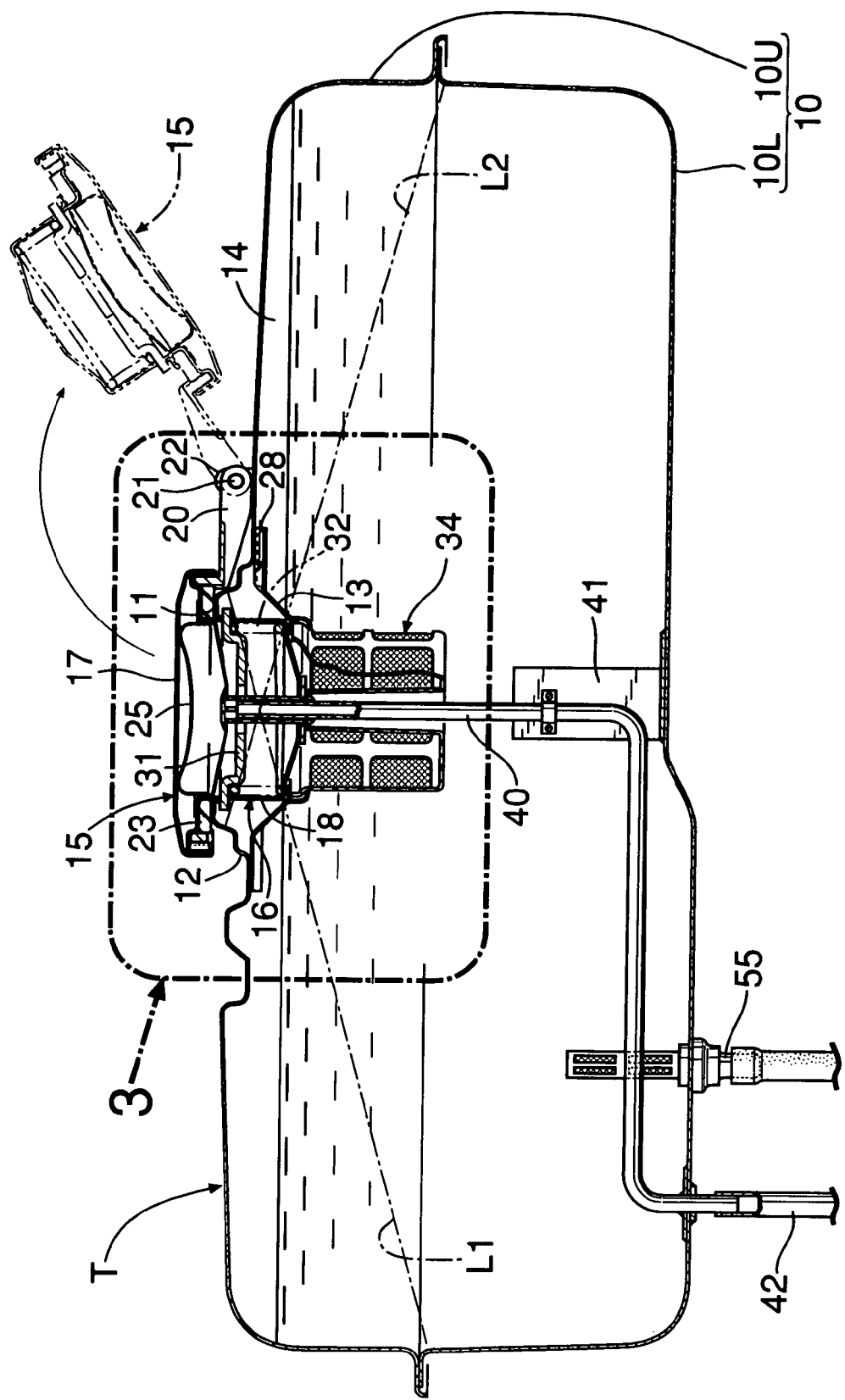
FIG. 2 is an enlarged sectional view taken along a line 2-2 in FIG. 1.

As shown in FIG. 2, the breather pipe 40 is disposed in the tank body 16 to extend vertically through the tank body 16. The breather pipe 40 is supported within the tank body 16 by a stay 41 fixed to an inner surface of the lower tank half 10L. The breather pipe 40 has an upper half substantially vertically extended and longitudinally passed through the through-passage 38 in the strainer 34 into the fuel cap 15; a lower half substantially horizontally extended along the bottom wall of the tank body 16; and a lower end liquid-tightly passed through the bottom wall of the tank body 16 and connected to an upper end of a flexible feed pipe 42 outside the tank body 16. The feed pipe 42 extends within the frame 2 and is connected to an inlet of the canister 9. An outlet of the canister 9 is connected to the carburetor 7 through another feed pipe 43.

As clearly shown in FIG. 3, an upper end portion of the breather pipe 40 is guided through the through-passage 38 in the strainer 34, longitudinally passed through a central portion of the breather chamber 27 through a fuel return hole 19 opened in a central portion of the support wall 13, and then passed through the spring seat 31 to open into an upper portion of the breather chamber 27. Thus, the upper end of the breather pipe 40 is located at a central portion of the fuel supply port 11.

The upper end portion of the breather pipe 40 which extends into the breather chamber 27, is capped by a cap seal 50. The cap seal 50 is formed of a soft rubber or synthetic resin material having fuel resistance, weather resistance and ozone resistance. In addition, the cap seal 50 is formed into a hollow cylindrical shape, and includes an umbrella-shaped cap portion 50c formed at its upper end, and a flange-shaped seal seat 50s and an annular fitting groove 50g formed at its lower end. The cap seal 50 is fitted over an outer periphery of the upper end portion of the breather pipe 40, so that the fitting groove 50g at its lower end is fitted and connected to the upper end of the through-passage 38 in the strainer 34. The cap portion 50c liquid-tightly seals the open upper end of the breather pipe 40. Further, the flange-shaped seal seat 50s seals the fuel return hole 19 provided at the lower end of the inner cap member 18 from its lower surface, thereby preventing the back flow of the fuel stored in the tank body 16 into the breather chamber 27, while permitting the flow of the fuel from the breather chamber 27 to the tank body 16. A locking piece 50e is provided on an inner surface of the cap portion 50c to protrude downwards, and engaged with the upper surface of the breather pipe 40, whereby the cap seal 50 is positioned. A plurality of ventilating bores 51 are made in an outer peripheral surface of an upper end of the cap seal 50 to provide communication between the breather chamber 27 in the fuel cap 15 and the inside of the breather pipe 50, thereby permitting the free flowing of air therebetween.

Thus, the upper portion of the breather pipe 40 is located at the central portion of the fuel supply port 11 and extends vertically along a longitudinal center line of the fuel cap 15. The level of the open upper end of the breather pipe 40 is slightly lower than the level of the fuel supply port 11. The open upper surface of the breather pipe 40 is liquid-tightly closed by the cap seal 50. The breather chamber 27 and the inside of the breather pipe communicate with each other through the ventilating bores 51.

Reference numeral 55 in the figures denotes a fuel supply pipe for supplying the fuel in the fuel tank T to the engine 3.

The operation of this embodiment will be described below.

When the fuel is charged into the tank body 10, the outer cap member 17 of the cap body 16 is held to remove the fuel cap 15 from the fuel supply port 11. At this time, as shown by a chain line in FIG. 2, the fuel cap 15 is turned about the hinge pin 22 through the opening/closing arm 20 and retained above the tank body 10, and hence cannot fall. Then, the fuel is charged into the tank body 16 through the fuel supply port 11 by a charging gun which is not shown. At this time, the charged fuel cannot flow into the breather pipe 40, because the open upper end of the breather pipe 40 is sealed by the cap seal 50. The charged fuel is transferred from the breather chamber 27 via the strainer 34 into the tank body 16 and stored therein. Even when the fuel in the tank 10 reaches a tank-full level in the process of the fuel charge, the fuel cannot flow into the breather pipe 40, because the upper end of the breather pipe 40 is located above the tank-full level of the fuel.

If the fuel cap 15 is closed after the completion of the charge of the fuel, the packing 23 is resiliently seated in the fuel supply port 11 by the action of the compression spring 32 to liquid-tightly seal the fuel supply port 11, as shown in FIGS. 2 and 3. The air chamber 14 in the upper portion of the tank body 14 is in communication with the breather chamber 27 through the plurality of air communication passages 28 in the tank body 16 and the through-holes 29, 29 in the fuel cap 15. Further, because the breather chamber 27 is in communication with the breather pipe 40 through the plurality of ventilating bores 51 in the cap seal 50, a breathing action is performed between the air chamber 14 and the external air through the breather chamber 27 and the breather pipe 40, whereby a constant pressure is maintained in the fuel tank T. The evaporated fuel in the air chamber 14 is transferred together with the air, through the breather pipe 40 and the feed pipe 42, into the canister 9 and stored therein. The fuel stored in the canister 9 is drawn through the other feed pipe 43 into the carburetor 7 in an intake system.

In some cases, the fuel in the tank body 16 may flow through the air communication passages 28 into the breather chamber 27 as shown by an arrow a in FIG. 3 due to the waving of the fuel in the fuel tank T. However, such fuel flowing into the breather chamber 27 is stored in the breather chamber 27 and then slowly returned through the fuel return hole 19 into the tank body 16.

In some cases, the engine-driven working machine 1 may be often moved on a bad road or an uneven ground, or operated on an inclined ground, so that the fuel tank T may be largely inclined. However, in such a case, for example, where the fuel tank T is largely inclined as shown by a dashed line in FIG. 3 and the level L1, L2 of the liquid surface of the fuel is inclined to the largest degree, the ventilating bores 51 in the upper end of the breather pipe 40 cannot be immersed in the fuel and the above-described breathing action is carried out without problems, because the upper end of the breather pipe 40 is located at the central portion of the upper surface of the fuel tank T. Also, because the fuel supply port 11 is located at the central portion of the upper surface of the fuel tank T, the fuel supply port 11 cannot be immersed in the fuel, thereby securing the sealability of the fuel supply port 11. Further, because the breather chamber 27 is formed within the fuel tank T and the upper portion of the breather pipe 40, into which the ventilating holes 51 open, is located to face the breather chamber 27, it is unnecessary to form the breather chamber 27 apart from the fuel cap 15, and the breather pipe 40 does not need to be extended outside around the outer periphery of the fuel tank T.

Furthermore, because the open upper surface of the breather pipe 40 is liquid-tightly sealed by the cap seal 50, the charged fuel cannot flow into the breather pipe 40 during charge of the fuel.

In the embodiment, the fuel tank according to the present invention has been described as a fuel tank for an engine-driven working machine, but the present invention is, of course, applicable to any fuel tank for any other engine of a vehicle.

Although the embodiment of the present invention has been described in detail, the present invention is not limited to the above-described embodiment, and various modifications in design may be made within the scope of the invention.

What is claimed is:

1. A breather system for a fuel tank including a tank body, an air chamber in the upper portion of the tank body, a fuel supply port located in a central portion of the upper wall of the tank body for adding fuel into the fuel tank and a fuel cap for closing the fuel supply port, the breather system comprising:

a breather pipe mounted on the tank body wherein breathing action is performed through the breather pipe between the air chamber and the exterior of the fuel tank; and a breather chamber formed in the fuel cap wherein the breather chamber is in communication with said breather pipe.

2. A breather system for a fuel tank according to claim 1, wherein the breather pipe includes an open upper surface at the upper end of the breather pipe facing the fuel supply port, the breather system further including a cap seal capped on the upper end of the breather pipe for sealing the upper end of the breather pipe, and a ventilating hole in a side face of the cap seal for communicating between the breather pipe and the breather chamber.

3. A breather system for a fuel tank including a tank body, an air chamber in the upper portion of the tank body, a fuel supply port located in a central portion of the upper wall of the tank body for adding fuel into the fuel tank and a fuel cap for closing the fuel supply port, the breather system comprising:
  a breather pipe mounted on the tank body wherein breathing action is performed through the breather pipe between the air chamber and the exterior of the fuel tank;
  a breather chamber formed in the fuel cap wherein the breather chamber is in communication with said breather pipe; and
  a strainer suspended from a lower portion of the fuel supply port for filtering fuel flowing into the breather chamber to return the filtered fuel to the tank body,
  wherein an upper end portion of the breather pipe passes through the strainer into the breather chamber.

4. A breather system for a fuel tank including a tank body, an air chamber in the upper portion of the tank body, a fuel supply port located in a central portion of the upper wall of the tank body for adding fuel into the fuel tank and a fuel cap for closing the fuel supply port, the breather system comprising:
  a breather pipe mounted on the tank body wherein breathing action is performed through the breather pipe between the air chamber and the exterior of the fuel tank;
  a breather chamber formed in the fuel cap wherein the breather chamber is in communication with said breather pipe; and
  a strainer suspended from a lower portion of the fuel supply port for filtering fuel flowing into the breather chamber to return the filtered fuel to the tank body,
  wherein the breather pipe includes an open upper surface at an upper end of the breather pipe facing the fuel supply port, the breather system further including a cap seal capped on the upper end of the breather pipe for sealing the upper end of the breather pipe, and a ventilating hole in a side face of the cap seal for communicating between the breather pipe and the breather chamber, and
  wherein the upper end portion of the breather pipe passes through the strainer into the breather chamber.

5. A breather system for a fuel tank according to claims 1, 2, 3 or 4, wherein the lower end of the breather pipe extends through the bottom wall of the tank body to the exterior thereof for connection to a canister.

6. A breather system for a fuel tank according to claim 2, wherein through-holes are provided on the fuel cap at positions radially facing each other, said through-holes communicating an inside of the breather chamber with the air chamber.

* * * * *